United States Patent

[11] 3,590,468

| [72] | Inventor | Robert W. Buck |
| | | Wheat Ridge, Colo. |
| [21] | Appl. No. | 800,649 |
| [22] | Filed | Feb. 19, 1969 |
| [45] | Patented | July 6, 1971 |
| [73] | Assignee | Sperry Rand Corporation |

[54] GLASSY PHASE METHOD FOR MAKING PURE ALUMINA-TO-METAL HERMETIC SEALS
9 Claims, 1 Drawing Fig.

[52] U.S. Cl. ........................................ 29/473.1, 29/504, 117/70, 204/38
[51] Int. Cl. ........................................ B23k 31/02
[50] Field of Search ........................................ 29/472.7, 472.9, 473.1, 504, 590; 204/38.2, 38.41; 117/70

[56] References Cited
UNITED STATES PATENTS

| 2,798,577 | 7/1957 | La Forge, Jr. | 29/473.1 X |
| 2,848,802 | 8/1958 | Luks | 29/472.9 X |
| 2,996,401 | 8/1961 | Welch et al. | 29/473.1 X |
| 3,057,445 | 10/1962 | Bronnes | 204/38 X |
| 3,203,084 | 8/1965 | Best | 29/473.1 |
| 3,290,171 | 12/1966 | Zollmann et al. | 29/473.1 X |
| 3,347,704 | 10/1967 | Meyer | 29/473.1 X |
| 3,403,043 | 9/1968 | Thompson | 29/472.7 X |
| 3,429,736 | 2/1969 | Thompson et al. | 117/70 |
| 3,438,118 | 4/1969 | Milch et al. | 29/472.9 |
| 3,507,979 | 4/1970 | Erkan | 29/473.1 X |

*Primary Examiner*—John F. Campbell
*Assistant Examiner*—Ronald J. Shore
*Attorney*—S. C. Yeaton

ABSTRACT: A method is described for making reliable hermetic seals between essentially pure alumina and metal. The method comprises applying a metallizing paint to the alumina, sintering the metallizing paint, placing a molybdenum trioxide-manganese dioxide coating on the metallizing layer, sintering the coating, and then bonding the metal to the coated alumina. The metallizing paint comprises molybdenum trioxide and a glass frit in an alcohol suspension containing a nitrocellulose binder, the glass frit constituting from about 2 percent to about 40 percent of the paint by weight.

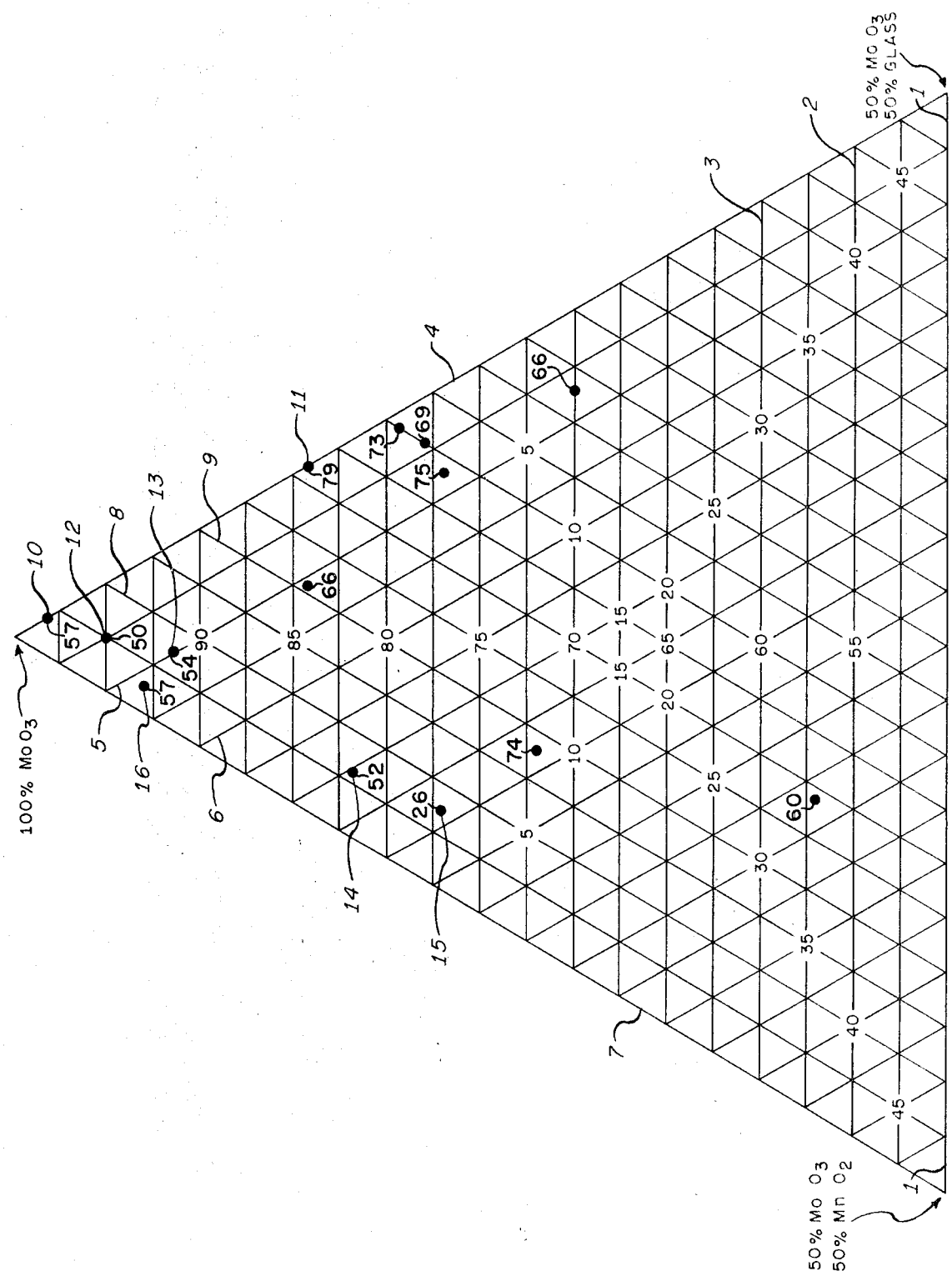

GLASSY PHASE METHOD FOR MAKING PURE ALUMINA-TO-METAL HERMETIC SEALS

BACKGROUND OF THE INVENTION

Conventional molybdenum-manganese techniques for metallizing ceramics have been found to be inapplicable for effecting sound pure alumina-to-metal hermetic seals. It is thought that such conventional techniques fail to metallize essentially pure alumina successfully because of the absence of any glassy phase in the alumina for establishing a molecular bond between the metallizing layer and the alumina. Pure alumina-to-metal seals of sound hermetic quality are required in a number of applications including the use of windows in microwave, infrared and visible light devices. In the case of polycrystalline alumina, the difficulty of providing an alumina-to-metal seal of sound hermetic quality increases as the purity of the alumina increases.

SUMMARY OF THE INVENTION

In accordance with the method of the present invention, a glassy phase is imparted to the seal area between the pure alumina and the metal through the use of a glass frit which is introduced in the range from about 2 percent to about 40 percent by weight into a metallizing paint also containing molybdenum trioxide and a nitrocellulose binder in an alcohol suspension. The metallizing paint is applied to the alumina and sintered at a temperature preferably in the range from about 1000° C. to about 1500° C. The application step and the sintering step may be repeated to achieve a desired thickness. Generally, two application steps with their respective sintering steps are sufficient. The sintered metallizing paint is then provided with a conventional molybdenum trioxide-manganese dioxide coating and sintered. The coating and sintering also may be repeated to increase the total thickness of the metallizing. It is preferable, however, that the total thickness of the combined metallizing paint and molybdenum trioxide-manganese dioxide coating be no greater than about 0.002 inches. Metal may then be bonded to the sintered molybdenum trioxide-manganese dioxide coatings by any known process, for example, by electroplating. The present method has been found to produce seals having tensile strengths in the range from about 5700 pounds per square inch to about 7900 pounds per square inch.

BRIEF DESCRIPTION OF THE DRAWING

The sole FIGURE is a triangular coordinate plot of experimentally derived tensile strength data resulting from the use of metallizing paints having varying proportions of glass frit, molybdenum trioxide and, optionally, manganese dioxide.

DESCRIPTION OF THE PREFERRED EMBODIMENT

The present invention is applicable to essentially pure alumina of both the monocrystalline and polycrystalline forms and will be described for purposes of example with respect to sapphire. A sapphire element, e.g., a sapphire window for use in a microwave, infrared or visible light device, is prepared for hermetic sealing to metal by placing a metallizing paint on the surfaces of the sapphire which are to be sealed to the metal. The metallizing paint comprises an alcohol suspension of molybdenum trioxide, glass frit and nitrocellulose binder. Manganese dioxide optionally may be present. The glass frit in the metallizing paint provides an molecular bond to the sapphire when the paint is sintered at a temperature in the range of about 1000° C. to about 1500° C. in a wet hydrogen atmosphere. After sintering, loose metallizing is removed by burnishing with a stainless wire brush. Preferably, a second coat of the same metallizing paint is applied, sintered and burnished as before.

In order to increase the metallizing thickness and also to mask the glassy phase in the sintered metallized paint, it is advantageous to place a plurality of coats of conventional molybdenum trioxide and manganese dioxide metallizing on the sintered metallized paint. The number of coats varies directly with the amount of glass frit in the metallizing paint. For example, it has been found that when the glass frit content is less than 25 percent by weight of the paint, two coats of molybdenum trioxide-manganese dioxide material is satisfactory. When the glass frit increased to more than 25 percent of the paint, three or more coats are desirable. For optimum bond strength, the total thickness of the coated metallizing paint should not exceed 0.002 inches. It is considered that the quality of the hermetic seal falls off substantially when the glass frit content of the metallizing paint exceeds about 40 percent while at least about 2 percent is the minimum amount required for satisfactory results.

Referring to the triangular coordinate plot of the sole FIGURE, a number of experimentally derived data points are designated by corresponding tensile strengths represented in terms of hundreds of pounds per square inch. Each of the data points represents the tensile strength of a respective sapphire-to-metal seal made by the method of the present invention. The method was varied only to the extend of changing the proportions of the molybdenum trioxide, manganese dioxide and glassy frit constituents of the metallizing paint. The tensile strength tests were made using sapphire plates metallized on opposite faces with two layers of sintered metallizing paint and two coats of sintered (80 percent Mo, 20 percent Mn) molybdenum trioxide and manganese dioxide in accordance with the present invention. The metallized faces were then nickel plated and copper brazed to a pair of ASTM test specimens. The specimens were pulled apart until the sapphire-to-metal seal failed whereupon the corresponding tensile strength was recorded.

The uppermost corner of the triangular coordinate plot represents a composition of metallizing paint which is 100 percent molybdenum trioxide. The lower lefthand corner represents a composition of 50 percent molybdenum trioxide and 50 percent manganese dioxide; the lower right-hand corner represents a composition of 50 percent molybdenum trioxide and 50 percent glass frit. More particularly, the base 1 of the triangular plot represents 50 percent molybdenum trioxide and each major horizontal line such as lines 2 and 3 is spaced by an amount representing an increment of 5 percent, e.g., line 2 represents 55 percent and line 3 represents 60. Correspondingly, side 4 of the triangular plot represents 0 percent manganese dioxide while each major inclined line having negative slope such lines 5 and 6 are spaced by an amount representing an increment of 5 percent. For example, inclined lines 5 and 6 represent respectively 5 percent and 10 percent manganese dioxide. In a similar fashion, side 7 of the triangular plot represents zero glass frit while major inclined lines having positive slope, such as lines 8 and 9, represent glass frit concentrations of 5 percent and 10 percent, respectively.

It should be noted that points 10 and 11 represent metallizing paints having no manganese dioxide constituent. As a matter of fact, point 11 represents a tensile strength of 7900 p.s.i. (the highest of the experimentally derived values) which was achieved using a metallizing paint comprising about 84 percent molybdenum trioxide and 16 percent glass frit by weight. It is considered that a tensile strength of at least 5700 p.s.i. is adequate for many hermetic seal requirements. Consequently, at least about 2 percent glass frit is required in the metallizing paint to assure sufficient tensile strength in the resulting bond and a correspondingly adequate hermetic quality. It will be observed that points 12, 13, 14 and 15 all represent approximately the same glass frit concentration of about 3 to 4 percent and varying amounts of molybdenum trioxide and manganese dioxide but have yielded seal tensile strengths of somewhat below 5700 p.s.i. These relatively low tensile strengths are believed attributable to procedural variations in carrying out the method of the present invention near the marginal end of the useful range of glass frit concentration. Points 10 and 16, for example, represent metallizing paints having less glass frit than the paints represented by points 12, 13, 14 and 15 but provided bonds having a tensile strength of 5700 p.s.i.

The upper limit for the glass frit content of the metallizing paint is more difficult to establish. As previously mentioned, the layers of sintered metallizing paint are covered by conventional molybdenum trioxide-maganese dioxide metallizing coatings. The greater the glass frit concentration in each layer of metallizing paint, the greater must be the number of coatings superimposed thereon. Increased thickness of the molybdenum trioxide-manganese dioxide coatings is required to mask the increased glassy phase provided by the greater glass frit concentrations in order to secure sound bonding to metal. The strength of the metal bonding significantly decreases when the total thickness of the sintered metallizing paint and the coatings exceeds 0.002 inches. Another problem aggravated by high glass frit content of the metallizing paint is the difference in thermal expansion coefficients between the glass and the molybdenum constituents which tends to cause cracks in the molybdenum film. Taking all of the foregoing considerations into account, it has been found that uniformly acceptable hermetic seals are provided by the method of the present invention when the glass frit content of the metallizing paint is less than about 40 percent.

Additional tests have established that the tensile strength of the sapphire-to-metal seals produced by the present invention is substantially unaffected by variations in the composition of the glass frit used in the metallizing paint. For example, the following three glass compositions yielded seal tensile strengths in excess of 6400 p.s.i when used in accordance with the present method.

| I | II | III |
|---|---|---|
| 3.3% CaO | 12.0% $K_2O$ | 0.4% $La_2O$ |
| 16.1% MgO | 4.6% $Na_2O$ | 1.0% $K_2O$ |
| 19.6% $Al_2O_3$ | 12.2% CaO | 3.9% $Na_2O$ |
| 61.0% $SiO_2$ | 17.8% BaO | 4.7% CaO |
|  | 10.8% $Al_2O_3$ | 1.1% SrO |
|  | 42.6% $SiO_2$ | 9.1% $Al_2O_3$ |
|  |  | 27.0% $B_2O_3$ |
|  |  | 52.8% $SiO_2$ |

The only requirement of the glass frit is that its melting point be less than the sintering temperatures employed.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A method for making hermetic seals between essentially pure alumina and metal, comprising the steps of
    applying a metallizing paint to said alumina,
    said paint consisting of molybdenum trioxide and a glass frit in an alcohol suspension, said glass frit constituting from about 2 percent to about 40 percent of said paint by weight,
    sintering said paint,
    applying a molybdenum trioxide-manganese dioxide coating on the sintered paint,
    sintering said coating, and
    bonding said metal to the sintered coating by a suitable technique.

2. The method of claim 1 where said paint is applied a plurality of times and said coating is applied a plurality of times.

3. The method as defined in claim 1 wherein said sintered coating constitutes by weight 80 percent molybdenum and 20 percent manganese.

4. The method as defined in claim 1 wherein said paint further includes a nitrocellulose binder.

5. The method defined in claim 1 wherein the total thickness of said sintered paint and said sintered coating is no greater than about 0.002 inches.

6. The method defined in claim 1 wherein said paint is sintered at a temperature in the range from about 1000° C. to about 1500° C.

7. The method defined in claim 1 wherein said paint further includes manganese dioxide.

8. The method defined in claim 1 wherein said alumina is sapphire.

9. The method defined in claim 1 wherein said alumina is polycrystalline of relatively high purity.